United States Patent [19]
Roberts

[11] Patent Number: 5,324,922
[45] Date of Patent: Jun. 28, 1994

[54] APPARATUS AND METHOD FOR MANAGING TRANSACTIONS

[75] Inventor: Alan B. Roberts, Palo Alto, Calif.

[73] Assignee: Verifone, Inc., Redwood City, Calif.

[21] Appl. No.: 22,129

[22] Filed: Feb. 25, 1993

[51] Int. Cl.$^5$ .............................................. G06F 15/20
[52] U.S. Cl. ................................. 235/375; 235/379; 235/462; 235/472
[58] Field of Search ............... 235/462, 472, 375, 379, 235/383; 364/401

[56] References Cited

U.S. PATENT DOCUMENTS

| | | | |
|---|---|---|---|
| 4,475,153 | 10/1984 | Kihara et al. | 235/463 |
| 4,521,678 | 6/1985 | Winter | 235/462 |
| 4,654,482 | 3/1987 | DeAngelis | 379/95 |
| 4,682,014 | 7/1987 | Iwama | 235/375 |
| 4,734,858 | 3/1988 | Schlafly | 235/380 |
| 4,947,028 | 8/1990 | Gorog | 235/380 |
| 4,954,699 | 9/1990 | Coffey et al. | 235/375 |
| 4,978,305 | 12/1990 | Kraft | 235/472 |
| 5,047,614 | 9/1991 | Bianco | 235/462 |

FOREIGN PATENT DOCUMENTS 21784 3/1989 Australia .............................. 235/383

*Primary Examiner*—John Sheppard
*Attorney, Agent, or Firm*—Lowell C. Bergstedt

[57] ABSTRACT

Apparatus for managing a transaction using a transaction terminal having a manual code reading device, such as a barcode reader, for reading a data code printed on a visual medium. A transaction program forming part of the system includes at least one page of a visual medium having a first and second sets of data codes printed thereon. The first set of data codes in printed in a prearranged sequence and comprises a predetermined sequence of program commands for carrying out all of the steps of a prearranged transaction, including a subset of program commands associated with a corresponding subset of data entry steps. The second set of data codes is printed on the same or another page of said visual medium. Each of the data codes in the second set comprises a prearranged item of transaction data for use in said data entry steps. The transaction terminal includes a computer means interfaced to said manual code reading means. This computer means including a program storage device and a data storage device. The program storage device stores both a command management program for managing the sequential entry and execution of said program commands and a set of command execution routines. Each of the command execution routines is associated with one of said program commands. The set of command execution routines including at least one data entry routine which, in turn, includes program steps for reading one of said second set of said data codes and storing the transaction data contained therein in said data storage means. The terminal has a modem for communicating the stored transaction data to a remote host.

17 Claims, 13 Drawing Sheets

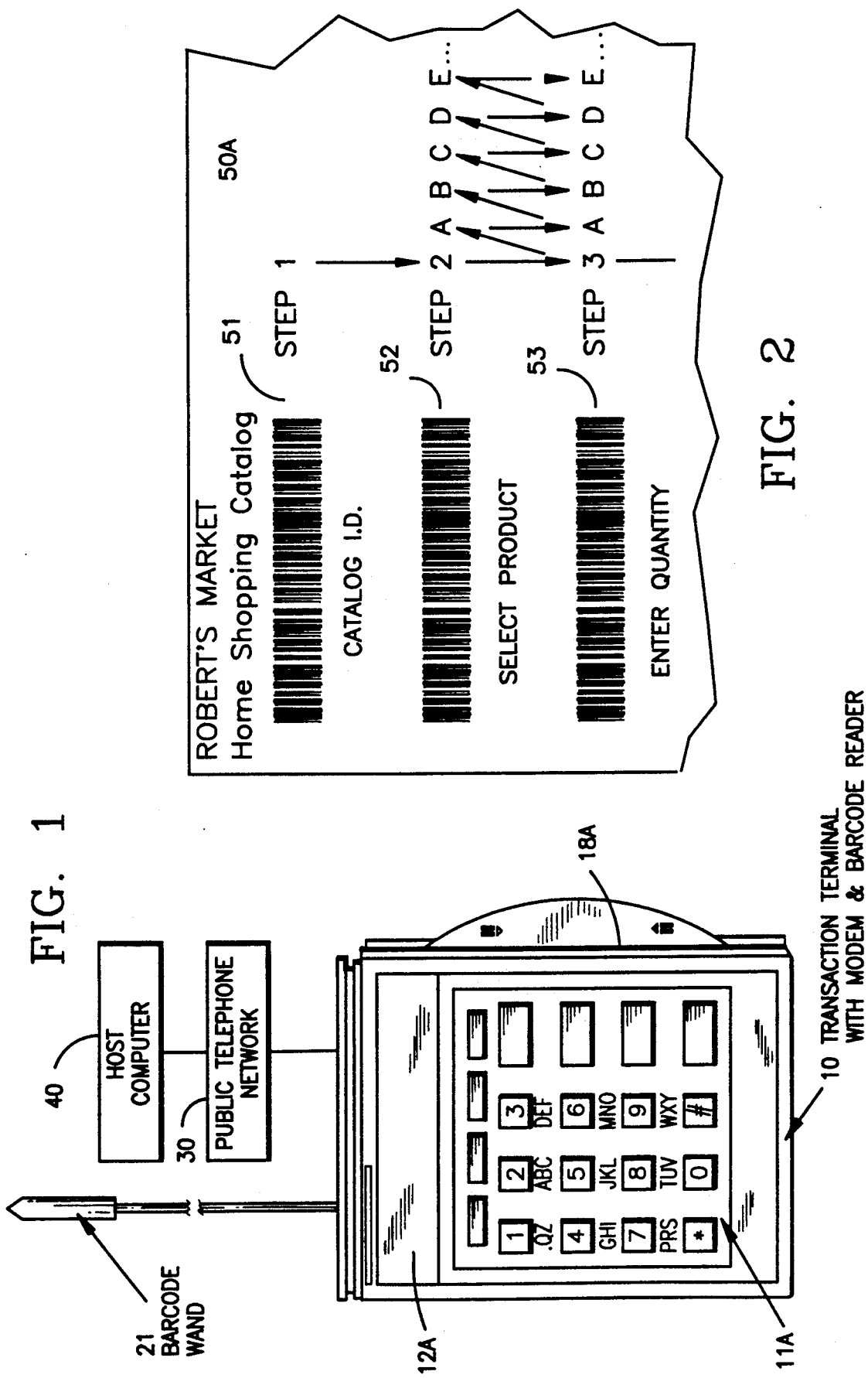

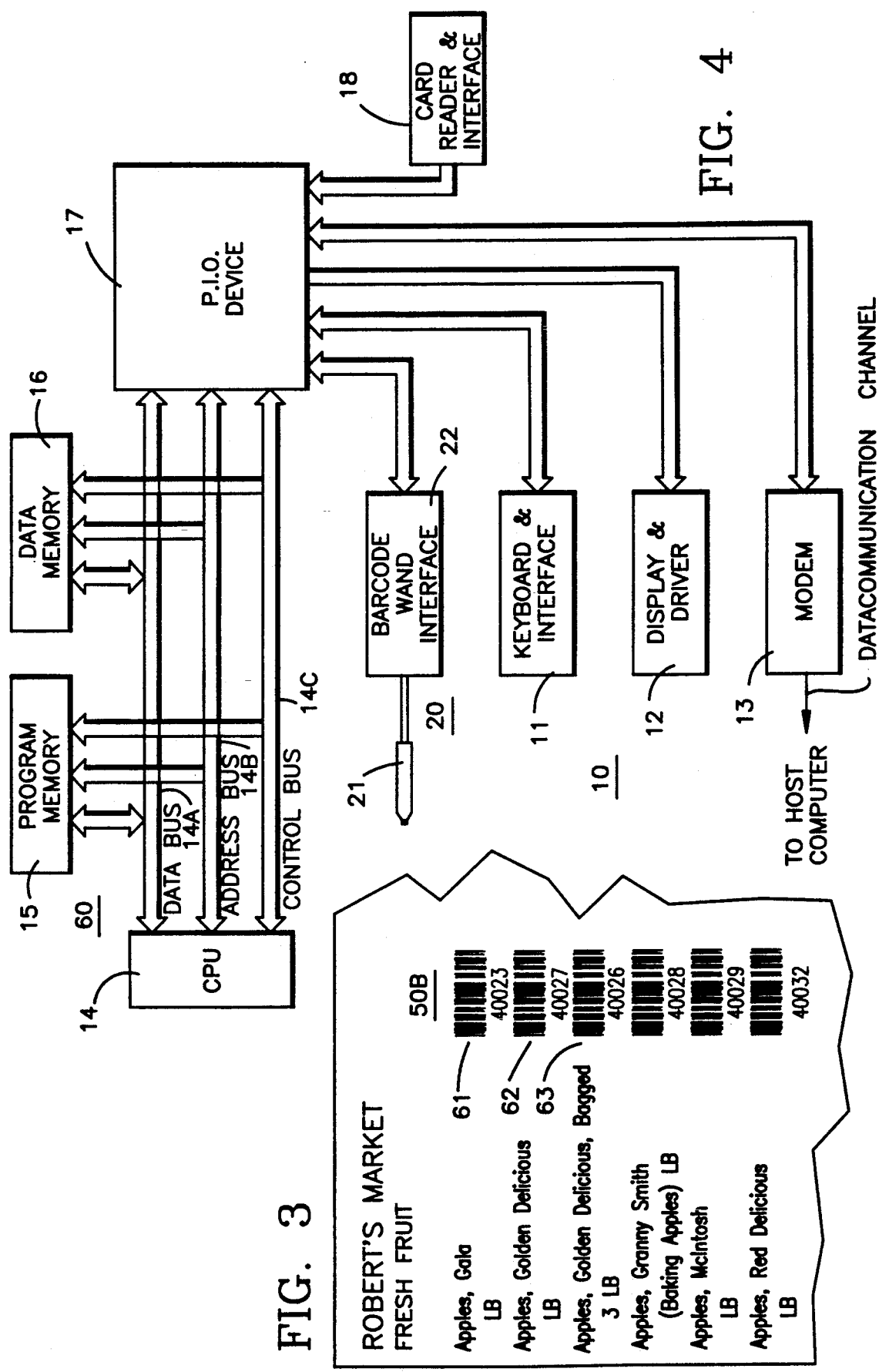

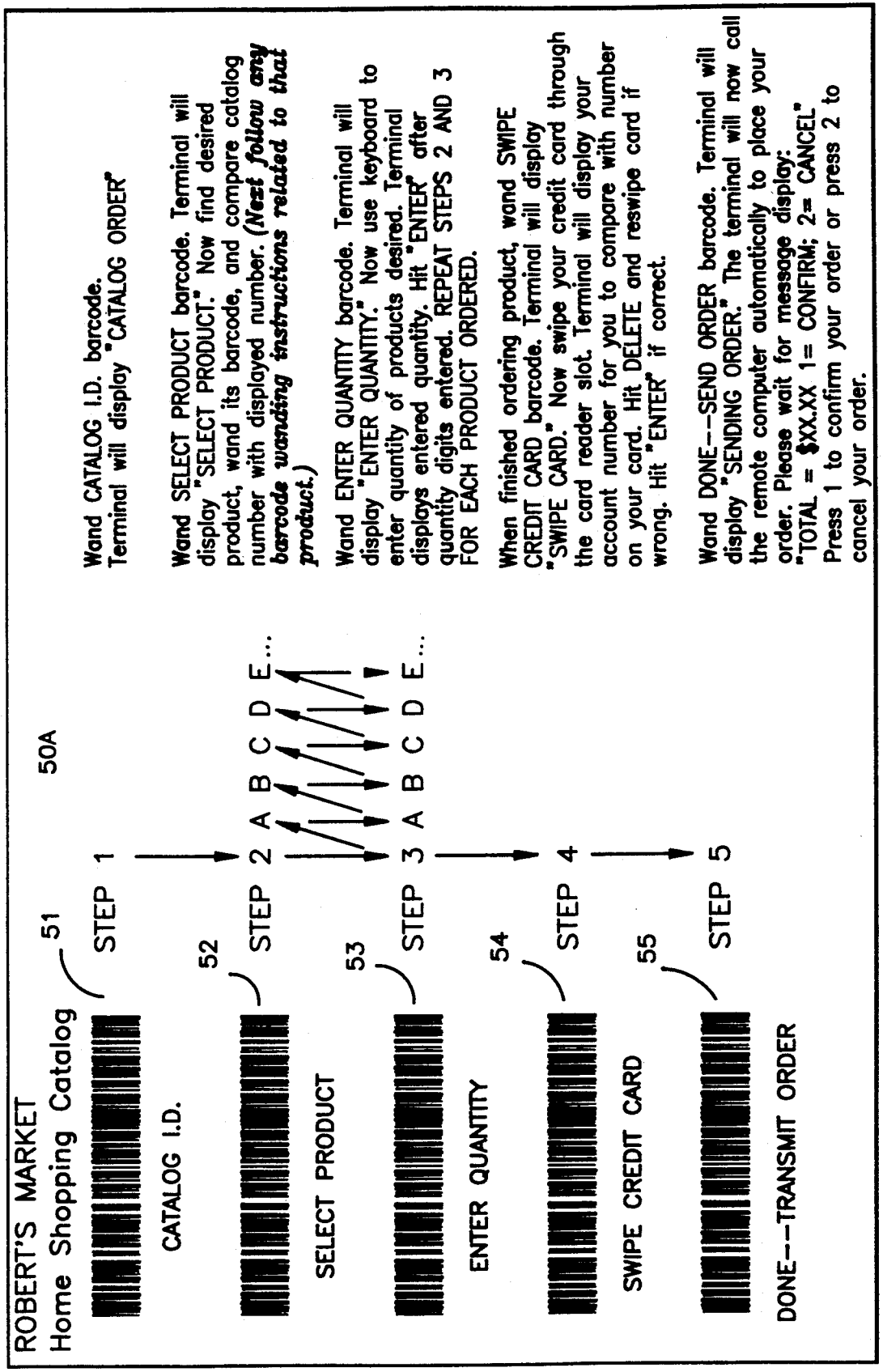

PLEASE DETACH AND RETURN THIS PORTION WITH YOUR PAYMENT

| Account Number | Statement Date | Payment Date | Total Due |
|---|---|---|---|
| 415 391-5788 489 158 N5 | Sep 26, 1992 | Oct 26, 1992 | $34.90 |

Enter Amount Paid > > >   $ ☐☐.☐☐
Make Check Payable to Pacific Bell

AMOUNT

SF/QB   10Z
         **CR99

ALVIN MARKS
354 WINDING WAY
SUITE 45
INDIANOLA, CA 94231

PACIFIC BELL
PAYMENT CENTER
SAC CA 95887 0001

PLEASE DETACH AND RETURN THIS PORTION WITH YOUR PAYMENT

| ACCOUNT NO. | STATEMENT DATE | DUE DATE | TOTAL DUE | MIN. DUE |
|---|---|---|---|---|
| 0786-312453 | Sep 30, 1992 | Oct 25, 1992 | $1,325.44 | $45.00 |

ENTER AMOUNT PAID ⟶   $ _____

PAY MINIMUM         PAY IN FULL

ACCOUNT HOLDER
John Q. Debtor
255 Quagmire Drive
Folsom, CA 94212

Creditor Furniture Co.
983 Easy Street
Folsom, CA 94205-1211

PAYEE BARCODE

| XYZ Polling Services, Inc. 1992 Election Poll-- Questions | | |
|---|---|---|
| 1. What age range will you be in at your next birthday ? | 1 | ▮▮▮▮ |
| 2. What is your income range ? | 2 | ▮▮▮▮ |
| 3. For whom did you vote in the Presidential election of 1988 ? | 3 | ▮▮▮▮ |
| 4. If the election were held today, I would vote for _____ | 4 | ▮▮▮▮ |
| 5. If only Bush and Clinton were running, I would vote for _____ | 5 | ▮▮▮▮ |
| 6. If only Bush and Perot were running, I would vote for _____ | 6 | ▮▮▮▮ |
| 7. If only Clinton and Perot were running, I would vote for _____ | 7 | ▮▮▮▮ |
| 8. I wish I had a more qualified slate of Presidential Candidates. | 8 | ▮▮▮▮ |
| 9. The Federal Budget Deficit is a major issue in this Election. | 9 | ▮▮▮▮ |
| 10. I believe that the Federal Budget Deficit must be eliminated by... | 10 | ▮▮▮▮▮ |
| 11. The candidate with the best ideas on the Budget Deficit is... | 11 | ▮▮▮▮▮ |
| 12. The U.S. National debt is a major issue in this election. | 12 | ▮▮▮▮▮ |
| 13. I believe that the U.S. National debt should be... | 13 | ▮▮▮▮▮ |
| 14. The candidate with the best ideas on the National debt is... | 14 | ▮▮▮▮▮ |
| 15. Every U.S. Citizen shoul be provided with adequate health insurance. | 15 | ▮▮▮▮▮ |
| 16. The U.S. Government should adopt a program of National Health Insurance. | 16 | ▮▮▮▮▮ |
| 17. If adopted, National Health Insurance shoul be administered by... | 17 | ▮▮▮▮▮ |

FIG. 16

| | | | | | |
|---|---|---|---|---|---|
| XYZ POLLING SERVICES, INC. 1992 Election Poll-- Answers | | | | | |
| 1. | 18-30 | 30-40 | 40-50 | 50-60 | OVER 60 |
| 2. | 0-10 | 10-25 | 25-50 | 50-100 | OVER 100 |
| 3. | BUSH | DUKAKIS | LIBERTARIAN | SOCIALIST | OTHER |
| 4. | BUSH | CLINTON | PEROT | OTHER | |
| 5. | BUSH | CLINTON | NOBODY | | |
| 6. | BUSH | PEROT | NOBODY | | |
| 7. | CLINTON | PEROT | NOBODY | | |
| 8. | STRONGLY AGREE | AGREE | NEUTRAL | DISAGREE | STRONGLY DISAGREE |
| 9. | STRONGLY AGREE | AGREE | NEUTRAL | DISAGREE | STRONGLY DISAGREE |
| 10. | 1996 | 2000 | 2010 | NEVER | DON'T CARE |
| 11. | BUSH | CLINTON | PEROT | OTHER | |
| 12. | STRONGLY AGREE | AGREE | NEUTRAL | DISAGREE | STRONGLY DISAGREE |
| 13. | GRADUALLY REDUCED | ELIMINATED BY YEAR 2025 | DON'T CARE | GRADUALLY INCREASED | HELD AT 1992 LEVEL |
| 14. | BUSH | CLINTON | PEROT | OTHER | |
| 15. | STRONGLY AGREE | AGREE | NEUTRAL | DISAGREE | STRONGLY DISAGREE |
| 16. | STRONGLY AGREE | AGREE | NEUTRAL | DISAGREE | STRONGLY DISAGREE |
| 17. | NEW FEDERAL DEPARTMENT | INDEPENDANT COMMISSION | DEPT. OF H.E.W. | FOR-PROFIT CORPORATION | NON-PROFIT ENTITY |
| ANSWER CODES | ‖‖‖‖ | ‖‖‖‖ | ‖‖‖‖ | ‖‖‖‖ | ‖‖‖‖ |

FIG. 17

XYZ Polling Services, Inc.
1992 Election Poll-- Questions/Answers
1. What age range will you be in at your next birthday ?
    
18-30     30-40     40-50     50-60     OVER 60
2. What is your income range(in thousands of dollars) ?
    
0-10      10-25     25-50     50-100    OVER 100
3. For whom did you vote in the Presidential Election of 1988?
BUSH      DUKAKIS   LIBERTARIAN   SOCIALIST   OTHER
4. If the election were held today, I would vote for_____
BUSH      CLINTON   PEROT     OTHER
FIG. 18

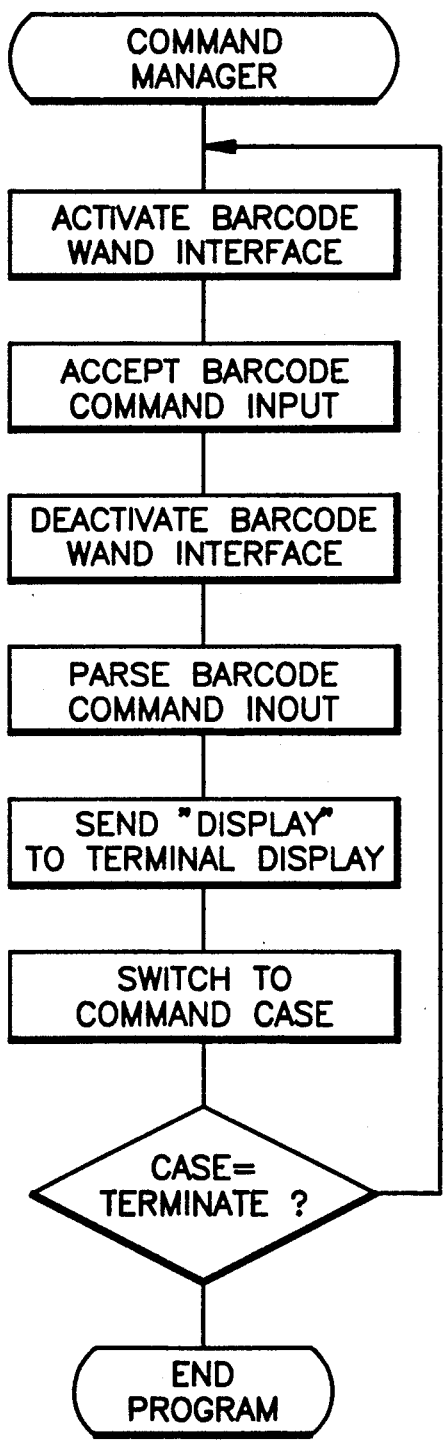
FIG. 19
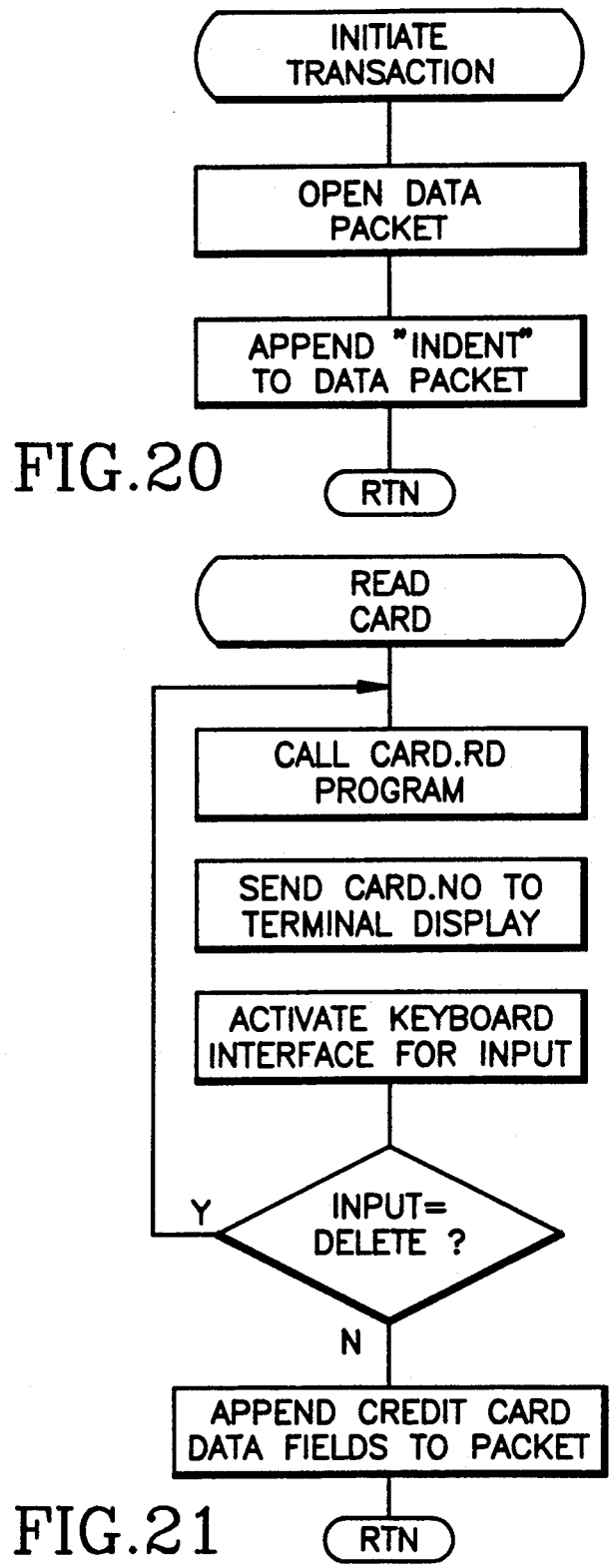
FIG. 20
FIG. 21

APPARATUS AND METHOD FOR MANAGING TRANSACTIONS

FIELD OF THE INVENTION

This invention relates generally to apparatus and methods for managing transactions using a transaction terminal to communicate with a remote host computer. More specifically, this invention relates to apparatus and methods for managing transactions of the type involving home shopping, bill paying and the like.

BACKGROUND AND PRIOR ART

The basic concept of using a point of transaction terminal communicating with a host computer to automate credit verification as an alternative to manual verification via a voice telephone call goes back to the 1960s.

Goldman U.S. Pat. No. 3,394,246, entitled "Status Indicating System," discloses a credit verification system related to check cashing information using card reader to identify the person with the terminal on line to central station where information on the persons credit activity and check cashing activity is kept.

In February 1966, Jones U.K. Patent Specification 1,019,702, entitled "Apparatus for Use in Connection with the Sale of Articles" was published. This British application discloses a local sales terminal networked to central processing computer station and included a card reader at the terminal used for credit card reading and a TAG reading device relating to goods being sold. The TAG reading operation results in code sent to central unit for price look up (PLU) and central unit sends back description and price for printing on a sales receipt. The credit card reader provides customer credit data and the terminal communicates with the central unit which has negative file storage for checking credit card data against a "blacklist" which is now typically called a "negative file."

Although the concept of credit transaction automation or credit verification using a local terminal communicating with a remote host has been around for several decades, it wasn't until the mid-1980's that a low cost credit verification terminal was developed, as shown in Chang et al. U.S. Pat. No. 4,788,420. This terminal promoted the widespread use of on-line credit verification by making the point of sale terminals affordable to small businesses.

POS terminals of this general type were developed for various applications, including one that integrated a wand type bar code reader for use in industrial applications like taking inventory.

Various concepts for use of a transaction terminal in the home shopping or home transaction environment are disclosed, for example, in DeAngelis U.S. Pat. No. 4,654,482, Schlafly U.S. Pat. No. 4,734,858, and Gorog U.S. Pat. No. 4,947,028, and Bianco U.S. Pat. No. 5,047,614. In each of these cases the home shopping terminal is preprogrammed with fixed program steps for automating each of a particular type of home transaction like ordering merchandise or food from a home shopping catalog or bill paying. In order to add other programs to the terminal, the program memory in the terminal must be altered or replaced, either by replacing the memory device such as a PROM that stores the application program or by downloading a new or modified program via the modem communication channel. Neither of these approaches is convenient for the home transaction environment. These approaches involve permanent loading of new or altered programs which are then utilized to operate the terminal to carry out the sequence of steps required for a particular home transaction.

It is well known in the art to use a bar code reader to enter the steps of a new program into a computer or calculator or to enter data into a computer or calculator. For example, Winter et al. U.S. Pat. No. 4,550,247 shows the use of bar codes and a bar code reader to enter a program into the memory of a computer for subsequent execution. Musch et al. U.S. Pat. No. 4,091,270 illustrates the use of bar codes to enter program commands or data into the memory of a programmable calculator. Awane et al. U.S. Pat. No. 4,608,487 shows the use of bar codes to input operational commands and control information like prices into an automatic vending machine. Poland U.S. Pat. No. 4,825,058 discloses the use of bar codes to configure operation of a computer device by loading operating or program parameters into memory.

It is believed that there is a need for an improvement in home transaction terminals which makes it easy to provide new transaction programs for use by the customer without requiring steps to modify the program stored in the terminal itself.

OBJECTS OF THE INVENTION

It is the principal object of this invention to provide improved apparatus for managing a transaction.

It is another object of this invention to provide a new and improved home transaction terminal apparatus.

It is another object of this invention to provide a home transaction terminal in which the transaction program is document driven rather than memory driven to facilitate adding new program capability to the system.

It is another object of this invention to provide an improved method of managing transaction data entry.

It is another object of this invention to provide an improved method of home transaction automation.

FEATURES AND ADVANTAGES OF THE INVENTION

One aspect of this invention features apparatus for managing a transaction comprising a transaction terminal having a manual code reading means for reading a data code printed on a visual medium and a transaction program which comprises machine readable data codes (such as bar codes) imprinted on a visual medium (such as a sheet of paper). At least one page of the visual medium has a first set of the data codes printed thereon in a prearranged sequence and this set comprises a predetermined sequence of program commands for carrying out all of the steps of a prearranged transaction. A subset of these program commands is associated with a corresponding subset of data entry steps. A second set of the data codes is printed on the same or another page of the visual medium and each of these data codes is a prearranged item of transaction data for use in the data entry steps.

The transaction terminal includes a computer interfaced to the manual code reads means and this computer includes a program storage device and a data storage device. The program storage device stores both a command management program for managing the sequential entry and execution of the program commands and a set of command execution routines. Each of the command execution routines is associated with one of the program commands. The set of command execution routines includes at least one data entry routine. This routine has program steps for reading one of the second set of the data codes and storing the transaction data contained therein in the data storage device.

These features illustrate that this invention does not store the application program in memory for later use in executing a transaction, but instead the commands of the application program are provided on a transaction program document and are input each time the user runs the program. While extra time is involved in user entry of the commands, relatively few steps are involved in the typical home transaction program and the time burden of command entry involves minimal additional time overhead relative to the overall time required for doing a transaction with an already stored program. The flexibility of changing the program and adapting the program to varying data entry parameters and sequences is a decided advantage for the home market where the vendor of the service wishes not to be restricted in its transaction service offerings but cannot afford to modify the transaction terminal once it is placed in the customers home.

In a preferred version this invention features a transaction terminal which also includes data communication device interfaced to the computer device and adapted for transmitting data via a communication channel to a host computer. In this version, the predetermined sequence of program commands includes a data transmit command following the subset of program commands associated with the subset of data entry steps. The command execution routine associated with the data transmit command includes a series of program steps for activating the data communication device to transmit data stored in the data storage device to the host computer.

Using the document driven programming feature of this invention the data transmit command can contain a data field which specifies which host computer to call or the default host already programmed into the system can be used in absence of such a specification. In this way the device can alternately be used for centralized transaction processing, i.e. at a single host computer network provided by a single service provider, or for local individual merchant transaction processing, with the type of processing determined by the document driven transaction program itself.

A preferred version of this invention also features at least one direct data entry device for entry of transaction data by a user of the terminal. In this version the predetermined sequence of program commands includes at least one direct entry program command associated with entry of transaction data through use of the data entry device. Also the set of command execution routines includes a direct data entry routine associated with the direct entry program command and comprises program steps for activating the direct data entry device to accept and store data entered into the data storage device. This feature provides the possibility that some of the transaction data can be input via a keyboard right on the terminal instead of using bar codes for all data entry.

A preferred version of the invention also includes in the transaction terminal a display device for displaying messages. In this version each of the program commands includes a message field comprising a message for display on the display device. The command management program includes a step for sending the message field to the display device as part of the command processing sequence.

The apparatus may be adapted for carrying out a plurality of different types of transactions, including at least one transaction involving use of a transaction data card having a magnetic stripe on which transaction data is stored. In this version a card reader device is used and may be a version of the typical magnetic stripe card reader used in VeriFone and other brands of transaction terminals. Other standard components may also be employed such as a wand reader device for reading printed bar codes, a keyboard for entering numeric data items, and a visual alphanumeric display.

When incorporating the invention in this type of apparatus, each of the first set of data codes is a printed bar code which includes a command code field, a message field, and a data field. The command code field has stored in it one of a set of code values representing the command type. The command types and associated codes include an 'initiate transaction' code value, a 'close transaction' code value, a 'read barcode' code value, a 'read data card' code value, and a 'keyboard entry' code value. The message field is used to store an alphanumeric descriptor related to the functional operation associated with the command. The data field is used to store a set of data elements which may be required for execution of the program steps in an associated command execution routine. The 'initiate transaction' command may include a mandatory data field comprising a transaction type code and a vendor identification code. Including both in the 'initiate transaction' command is an efficient approach to programming, but it should be understood that these items of data could be entered using data entry type program commands in separate program steps. In this version of the invention, each of the second set of data codes is a printed bar code which includes at least a data field storing a unique code.

The command execution routine associated with the 'initiate transaction' code value includes a program step to open a data packet location in the data storage device followed by a step to store the mandatory data field in the data packet. The command execution routine associated with each of the 'read barcode' code value, 'read data card' code value, and 'keyboard entry' code value includes a program step to activate the associated interface device and a program step to append one or more data fields input by the associated device to the data packet in the data storage device. The command execution routine associated with the 'close transaction' code value includes program steps to close the data packet, to activate the data communication device to establish a data link to the host computer, and to send the data packet to the host computer.

In this version, for each transaction program document, the first set of data codes comprising the predetermined sequence of program commands includes at least a first data code item with an 'initiate transaction' code value in the command code field, at least one subsequent data code item with a 'read barcode' code value in the command code field, and at least one subsequent data code item with a 'close transaction' code value in the command code field. The other program commands in type and sequence are determined by the transaction functions which are to be carried out.

It should be apparent from this description of the features of the invention, that using a document driven programming with the terminal storing only a set of command execution routines or primitives, makes it possible to add program types and specific transaction programs at will simply by supplying the customer with the program documentation with the printed program command codes.

This invention also features a method of managing the entry of transaction data. This method is based on first performing the following steps:

a. defining a transaction program command structure including at least a command code field and a data field;

b. defining a transaction data structure;

c. defining a set of transaction program commands each associated with a prearranged transaction program function, including at least one data entry function, and utilizing the transaction program command structure; and d. providing a set of command execution routines each associated with one of the transaction program commands and includes program steps for carrying out the prearranged transaction program function.

Those steps determine what the commands are and what the program primitives are to accomplish a range of transaction function such as data input of different types.

Once these basic defining and programming steps are completed, the method proceeds with the steps of e. imprinting on a visual medium a first set of data codes representing a prearranged sequence of the transaction program commands and a second set of data codes representing a prearranged set of transaction data items for selective use in the data entry function.

This step provide the actual transaction program for carrying out a particular type of transaction.

The user performed steps come next:

g. scanning each of the first set of imprinted data codes in sequence with a manual code reader and in response to each of the imprinted data codes executing an associated command execution routine; and h. scanning a selected one of the second set of imprinted data codes in response to a command execution routine calling for data entry and recording data associated with the data code as a data field in a data packet associated with the transaction being entered.

Again, it will be seen that the method of this invention involves a document driven live programming of the terminal by the user, with the functions involved being handled step by step, so that a data entry command is followed by actual data entry by the user.

Preferably the method of this invention is adapted for use by a customer to manage transaction entry and communication to a host computer, and allowing for pluralities of transaction programs of different types and different vendors within each type. In this preferred version. step c. includes defining transaction program commands comprising 'initiate transaction' and 'close transaction' with the 'initiate transaction' command including a 'transaction type' and 'vendor identification' data fields. In addition, step d. includes these steps:

d.1. providing a command execution routine for the 'initiate transaction' command which includes a step of creating a data packet with the 'transaction type' and 'vendor identification' data fields stored therein, and d.2. providing a command execution routine for the 'close transaction' command which includes a step of closing the data packet and transmitting the closed data packet to a host computer.

Finally step e. is carried out separately to create a separate and, most often unique, transaction program associated with each vendor. The prearranged sequence of transaction program commands includes, in each transaction program, a first command of the 'initiate transaction' type and a last command of the 'close transaction' type.

The apparatus and method of this invention contemplate a document driven programming of the terminal to manage transaction data collection and the building of a stored transaction data packet which can then be sent to the host computer via the data communication channel. Of course the host computer must be able to recognize the meaning and significance of each of the data fields in the data packet which is received. However, since the host computer receives, with the data packet, an identification of the vendor and the transaction program involved, it is a relatively simple matter for the host computer to interpret the contents of the data fields in the received data packet.

Other objects, features and advantages of this invention will be apparent from a consideration of the detailed description of various embodiments given below in conjunction with the accompanying drawings.

BRIEF DESCRIPTION OF DRAWING FIGURES

FIG. 1 is a pictorial view of components of transaction automation system useful in one embodiment of apparatus and method of this invention.

FIG. 2 is a fragmented view of a portion of a transaction program useful in one embodiment of apparatus and method of this invention.

FIG. 3 is a fragmented view of another portion of a transaction program useful in one embodiment of apparatus and method of this invention.

FIG. 4 is a block schematic diagram of components of transaction automation system useful in one embodiment of apparatus and method of this invention.

FIG. 5 illustrates a program command sheet serving as a portion of a transaction program useful in one embodiment of the apparatus and method of this invention for the purpose of ordering items from a home shopping catalog.

FIGS. 13 and 14 illustrate alternative types of billing invoices for use as program data sheet portions of a transaction program useful in one embodiment of apparatus and method of this invention for the purpose of automated bill payment.

FIGS. 16 and 17 illustrate program data sheets each serving as a portion of a transaction program useful in one embodiment of apparatus and method of this invention for the purpose of automated polling or surveying of citizen attitudes.

FIG. 18 illustrates an alternative program data sheet serving as a portion of a transaction program useful in one embodiment of apparatus and method of this invention for the purpose of automated polling or surveying of citizen attitudes.

FIG. 19 illustrates a command manager program useful in one embodiment of apparatus and method of this invention.

FIG. 20 illustrates an initiate transaction routine useful in one embodiment of apparatus and method of this invention.

FIG. 21 illustrates a read card routine useful in one embodiment of apparatus and method of this invention.

DESCRIPTION OF EMBODIMENTS OF THE INVENTION

Figures 6, 7:
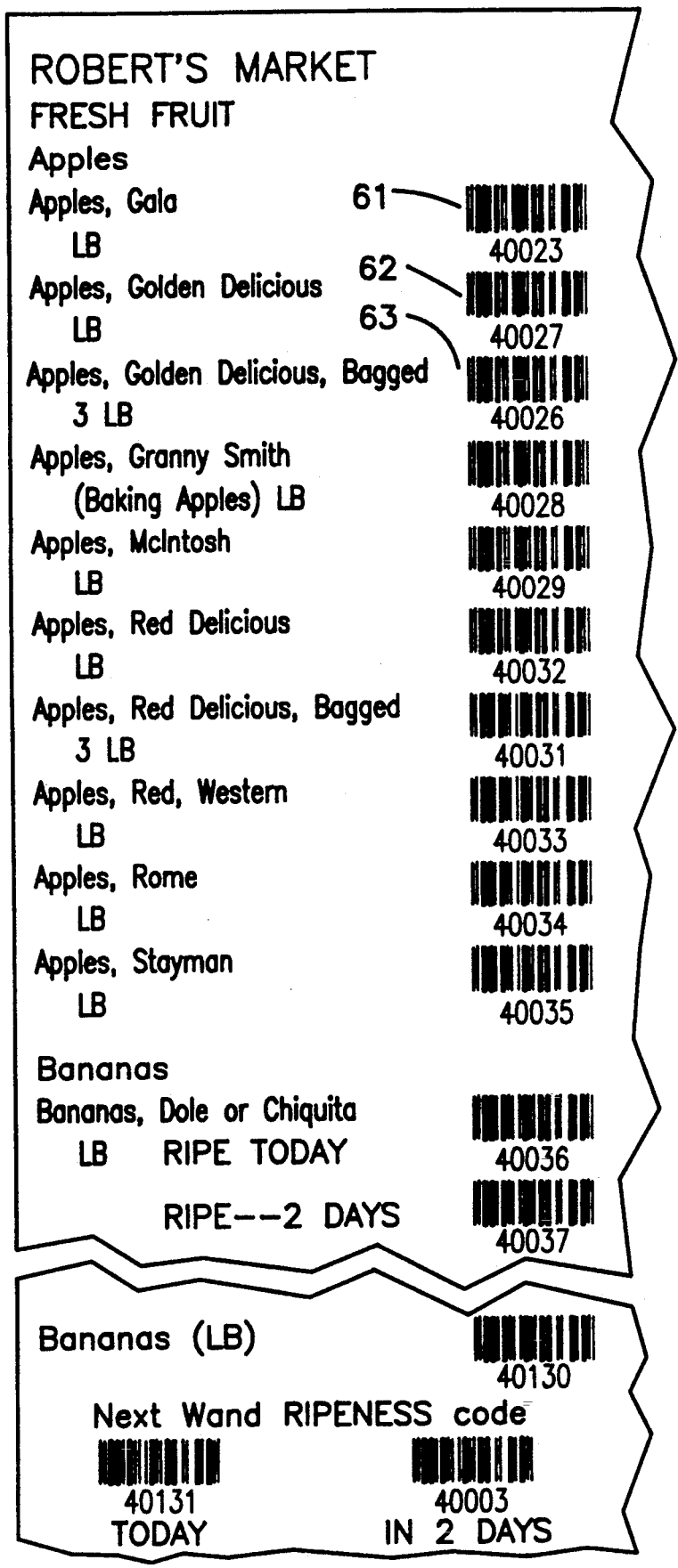
FIG. 6 illustrates a portion of a program data sheet serving as a portion of a transaction program useful in one embodiment of the apparatus and method of this invention for the purpose of ordering items from a home shopping catalog.
FIGS. 7–10 illustrate portions of another program data sheet serving as a portion of a transaction program useful in one embodiment of apparatus and method of this invention for the purpose of ordering items from a home shopping catalog.

FIGS. 1-4 illustrate components of an apparatus for managing a transaction in accordance with this invention as a transaction terminal 10 which includes a manual code reading means in the form of a bar code reader 20 with wand 21 and associated interface circuitry 22, and a transaction program which includes a program command sheet 50A shown in FIG. 2 and a program data sheet 50B shown in FIG. 3. It should be noted that the barcodes shown in the figures are not intended to be actual operative barcodes in a particular working embodiment, but merely illustrative of the general conceptual use of such barcodes.

Preferably the apparatus also includes a data communication means in the form of a modem 13 which may be an internal modem designed for connection to a public phone system or an external cellular modem. The apparatus may also include a direct data entry means such as keyboard 11 and a display device such as display 12 which may comprise any of the standard alphanumeric display technologies. Direct data entry could also be provided by other means such as: a combination of bar code reader 20 and an alphanumeric bar code data sheet or a voice command input system. Other types of display devices could also be employed such as a CRT display if terminal 10 were interfaced to a personal computer or a voice synthesis output device to produce a spoken message display.

Terminal 10 also includes a card reader 18 in the form of a magnetic stripe reader which is mounted in relation to card slot 18A. As is well known, when a data card manually swiped through card slot 18A in the right orientation, the data on the magnetic stripe will be read and decoded and stored in the computer. There are many ways to implement this function, including the approach disclosed in Chang et al. U.S. Pat. No. 5,019,696.

Transaction terminal 10 includes a computer means such as a microcomputer system 60 shown in FIG. 4. This computer means includes a CPU 14 communicating via a data bus 14A, address bus 14B and control bus 14C with a program storage means such as program memory 15 and a data storage means such as data memory 16 and a programmable input/output device (PIO Device) 17. Program memory 15 stores a command management program and a set of command execution routines, details of which will be discussed later. Depending on computer architecture, program memory may also store an operating system for the terminal or some or all of the operating system may be stored on board CPU 14. PIO 17 is part of a standard microcomputer architecture and provides program selective data and command communication with the various data input/output devices of the system. This is all standard microcomputer technology and is well known to persons in this art. Thus a detailed description of the system architecture and its operation are not required.

User Operation of the System

Before setting forth the details of the underlying system operation, it will be an aid to understanding of the invention if the operation of the invention is first considered from the user's standpoint. Referring to FIG. 1 in conjunction with FIGS. 5 and 6, the steps of a home shopping transaction will be described. Each of the bar codes 51-55 on program command sheet 50A comprises a specific program command which has a predefined program command structure to be discussed in detail later. Each of these specific program commands invokes a command execution routine under the management of a command manager routine, also to be discussed later. Here we will describe how the user perceives the operation of the system of the invention and generally what is happening in the system as each command is executed and each item of data is entered.

The user turns on the terminal 10 and waits momentarily for it to go through initialization routines. When display 12 reads "READY" the user performs step 1 and wands bar code 51. The message "CATALOG ORDER" appears on display 12 and, in the terminal a data packet file is opened in the data memory and a transaction code signifying a 'catalog order' is entered into the data packet along with a vendor or catalog identification code. These may be entered as a single field or separate fields.

Step 2 is then performed by wanding the bar code 52. The terminal displays "SELECT PRODUCT" and as the instructions indicate, the user will then wand one of the bar codes printed on the product data sheets of the catalog, such as bar code 63 in FIG. 6. Display 12 will contain the associated product code and the user can compare it to the numeric code printed below the bar code if he wishes to verify that the codes match. [The user can always cancel a data entry step by hitting the 'Delete' key on keyboard 11 and then wanding another bar code or making a keyboard entry depending on the method of data entry specified by the program command previously entered.] The product code is appended to the packet as a separate data field when the bar code is wanded. If the Delete key is hit, the field is deleted.

After the user has selected the desired product, Step 3 is then performed by wanding bard code 53 in FIG. 5.

Display 12 shows the message "ENTER QUANTITY" and the user enters how many bags of apples he desires using keyboard 11, followed by hitting the 'ENTER' key. When the enter key is hit, the numerical quantity entered by the user is appended to the data packet in data memory as a separate field. Steps 2 and 3 and their associated data entry steps are then repeated for each product that the user wishes to order.

When all desired products have been entered, the user goes to step 4 and wands bar code 54. Display 12 shows the message "SWIPE CARD" and the user swipes his credit card through card slot 18A. The credit card number is then displayed on display 12 for the user to compare with the number on the card. The user then hits Enter to append the card number data to the data packet as a separate field.

Finally, the user wands bar code 55 and the terminal responds by displaying "SENDING ORDER" and then closing the data packet. The terminal dials up the host computer and downloads the data packet to the host. The host sends back a command that causes the terminal to display the total dollar value of the order and ask for a confirm or cancel data entry as shown in the instructions. The used hits key "1" to confirm the order and the terminal sends this to the host to complete the transaction. The host may then send a final acknowledgment and the process is completed. The terminal now displays "READY" again and the user can move on to another transaction or turn the terminal off.

Figure 8:
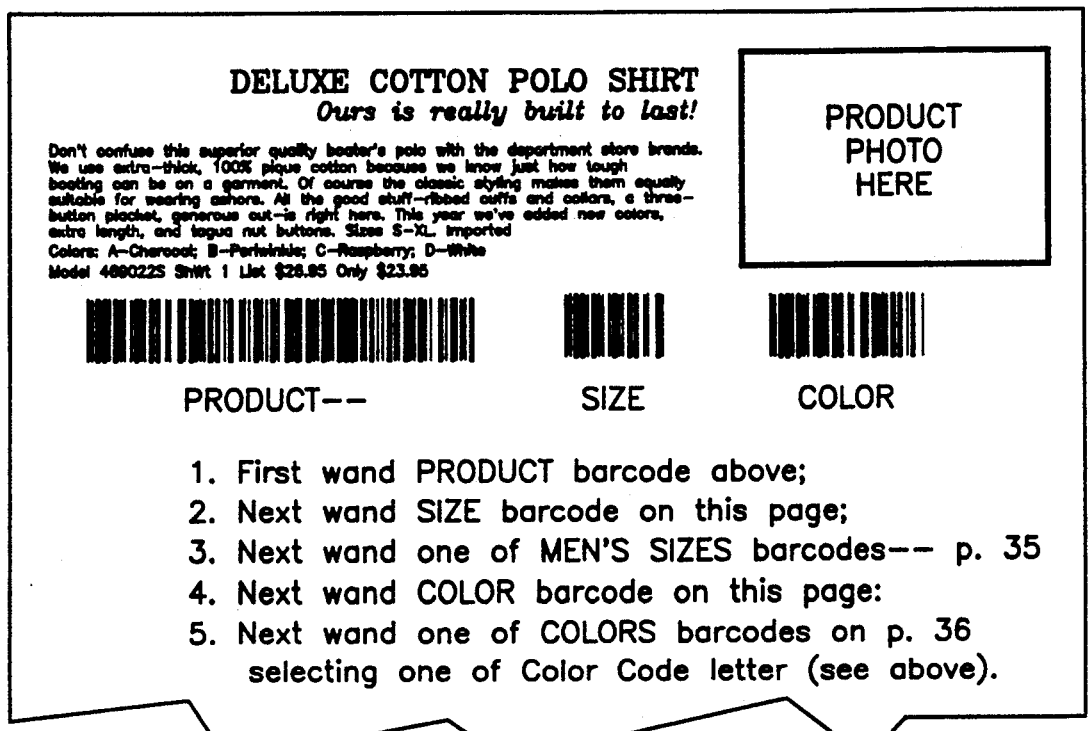
Figure 9:
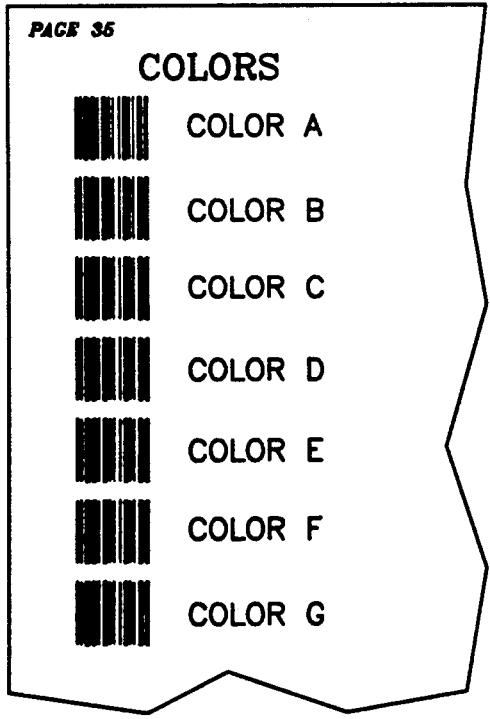
Figure 10:
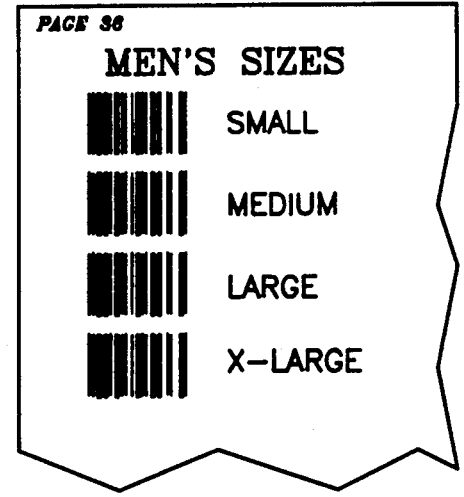

The system of this invention has complete flexibility in the inclusion of programming steps. Note in FIG. 6 that two bar codes are shown for bananas, one for "RIPE TODAY" and one for "RIPE—2 DAYS" so that the customer can select which type. FIG. 7 shows that this could be broken down into two separate data entry steps with the bar code for bananas indicating the product and the two other separate barcodes specifying ripeness. With this degree of selectivity, there is no good reason to break the process down into two steps. However, as shown in FIGS. 8-10, there are some catalog products that have multiple parameters to specify and it would be impracticable to use a set of single bar codes to specify all of the permutations and combinations of parameters. If you have four sizes and four colors of shirts to choose from, obviously you would have to have sixteen bar codes for just that one product and repeat them for any other product that had the same parameter selection requirement.

With the system of this invention, nested program commands are used such as shown in FIG. 8 to provide for separate data entry steps for the sub-parameters of the product, like size and color and then a single set of bar codes for color and size can serve a multiple of different product items. So to order the polo shirt shown in FIG. 8, the customer would first wand the SELECT PRODUCT bar code 52 on the program command sheet, followed by wanding the PRODUCT bar code in the data entry sheet shown in FIG. 8. The code for the product is appended to the data packet after this step is completed. Then the SIZE bar code is wanded. This is a nested program command and specifies another data entry step. Following this, one of the bar codes in FIG. 10 is wanded and this results in the appending of a size code to the data packet. Next the COLOR bar code is wanded. This is another nested program command and specifies another data entry step using the bar code data entry device. Here, the actual colors signified by the various COLORS bar codes are not listed by the codes themselves but are specified in the description of the product. This space sharing of the COLORS bar codes saves further space in the catalog. When the customer wands one of the COLORS bar codes, the associated data is appended to the data packet in the computer memory. It should be apparent that this could be extended to additional product parameter specification, such as a monogram and the letters of the monogram.

Now, note that all the transaction terminal system is doing is responding to the program commands and the associated data entry steps to build a data packet comprising sequential data fields in the form of one or more data items per product ordered. The host computer has to be programmed to recognize the significance of each of the data fields. In other words, the host computer has to recognize which of the fields are product specifier codes and which are product parameter specifiers and be able to sort out the meaning of the parameter specifiers. There is no major difficulty involved in this host computer operation, since it is mainly a table lookup type of operation that is specific to the vendor and the catalog from which the customer is ordering via the terminal.

It should be understood that the size and color selection steps here could be performed using other data entry approaches. The body of the product description could give alphanumeric codes for each size and color and these could then be entered via the keyboard. Thus it is seen that the vendor who puts out the catalog has full control of the programming of data entry in its catalog.

It should also be understood that there are optional ways of accomplishing the effect of nested program commands without actually requiring the customer to wand additional program command bar codes to specify the separate data entry steps. For example, the command execution routine for the SELECT PRODUCT bar code 52 could include program steps to deal with a 'repeat data entries' parameter in the PRODUCT bar code associated with the product being ordered. The last code bit of the PRODUCT bar code data could be used as a 'repeat' code bit with a value indicating how many times to repeat the SELECT PRODUCT operation of bar code data entries. The instructions could then specify that the wanding of the PRODUCT bar code should be followed by wanding of one of each of the sets of parameter specifying bar codes on other pages of the catalog. If multiple vendors and multiple catalogs are serviced through the same host computer, it might be a good idea to require uniformity in approach between vendors so as to make it convenient for the customer to master the system of data entry.

Another variation of this invention would be to structure the command manager routine so that wanding of the SELECT PRODUCT and ENTER QUANTITY bar codes did have to be repeated for each product ordered. This could be done by temporarily storing these commands in program command buffers so the customer could repeat each of them by hitting a single key, like the P key for SELECT PRODUCT and the N key for ENTER QUANTITY. This would make it easier for the customer who is ordering a substantial number of items. Instead of having to return to the program sheet to enter commands via bar code wanding, the keyboard entry achieves a repeat of the desired command. Another variation would involve repeating the SELECT PRODUCT and ENTER QUANTITY bar codes on each product page of the catalog they would be accessible without returning to the separate program command sheet or page.

Figure 11:
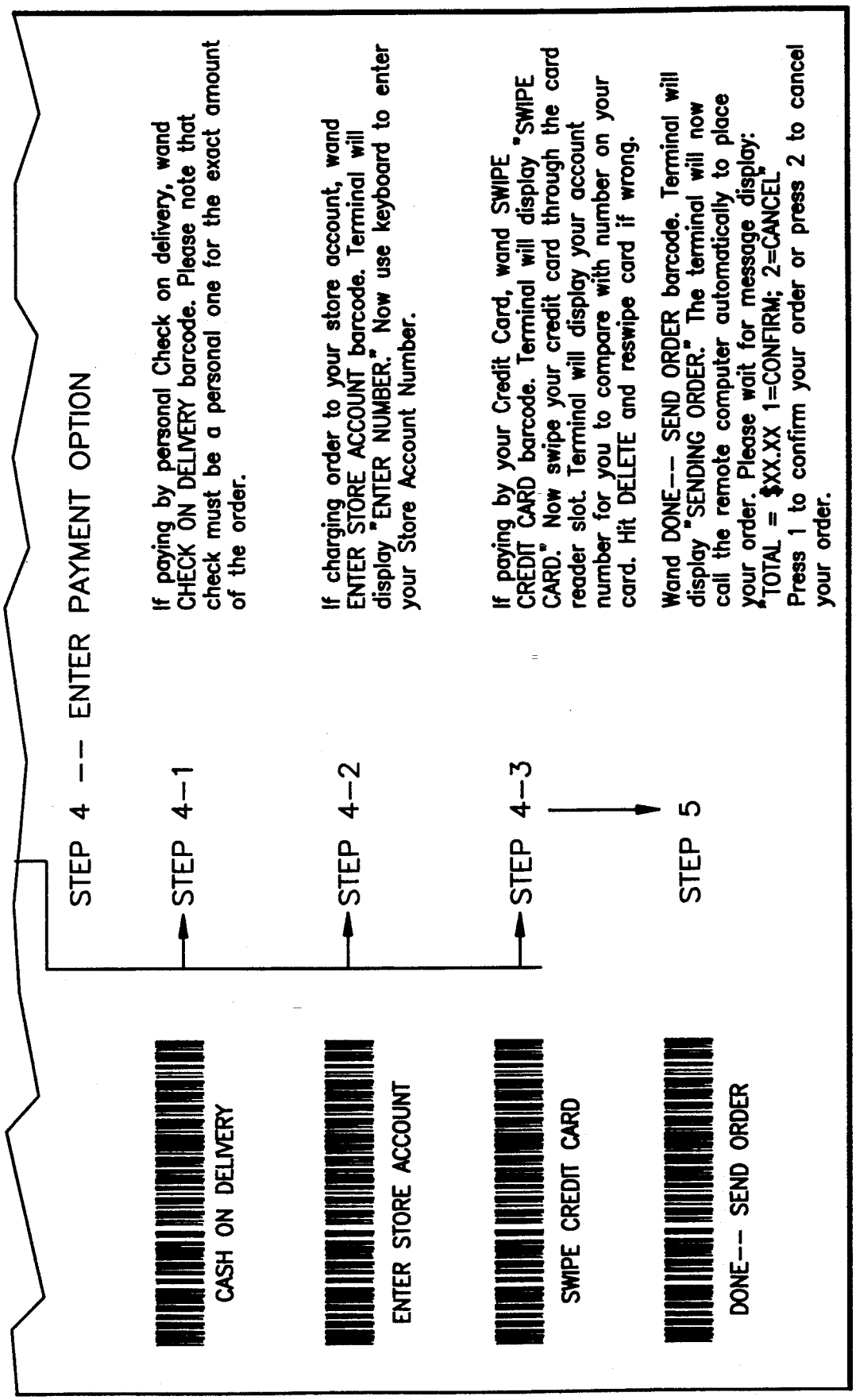
FIG. 11 illustrates an alternative program command sheet serving as a portion of a transaction program useful in one embodiment of apparatus and method of this invention for the purpose of ordering items from a home shopping catalog.

Now, referring to FIG. 11, it is seen that the program steps on the program command sheet can include options within a particular step. Here, instead of requiring that the order be paid for with a credit card as in FIG. 5, there are three options given for STEP 4.

Other Transaction Programs

Figure 12:
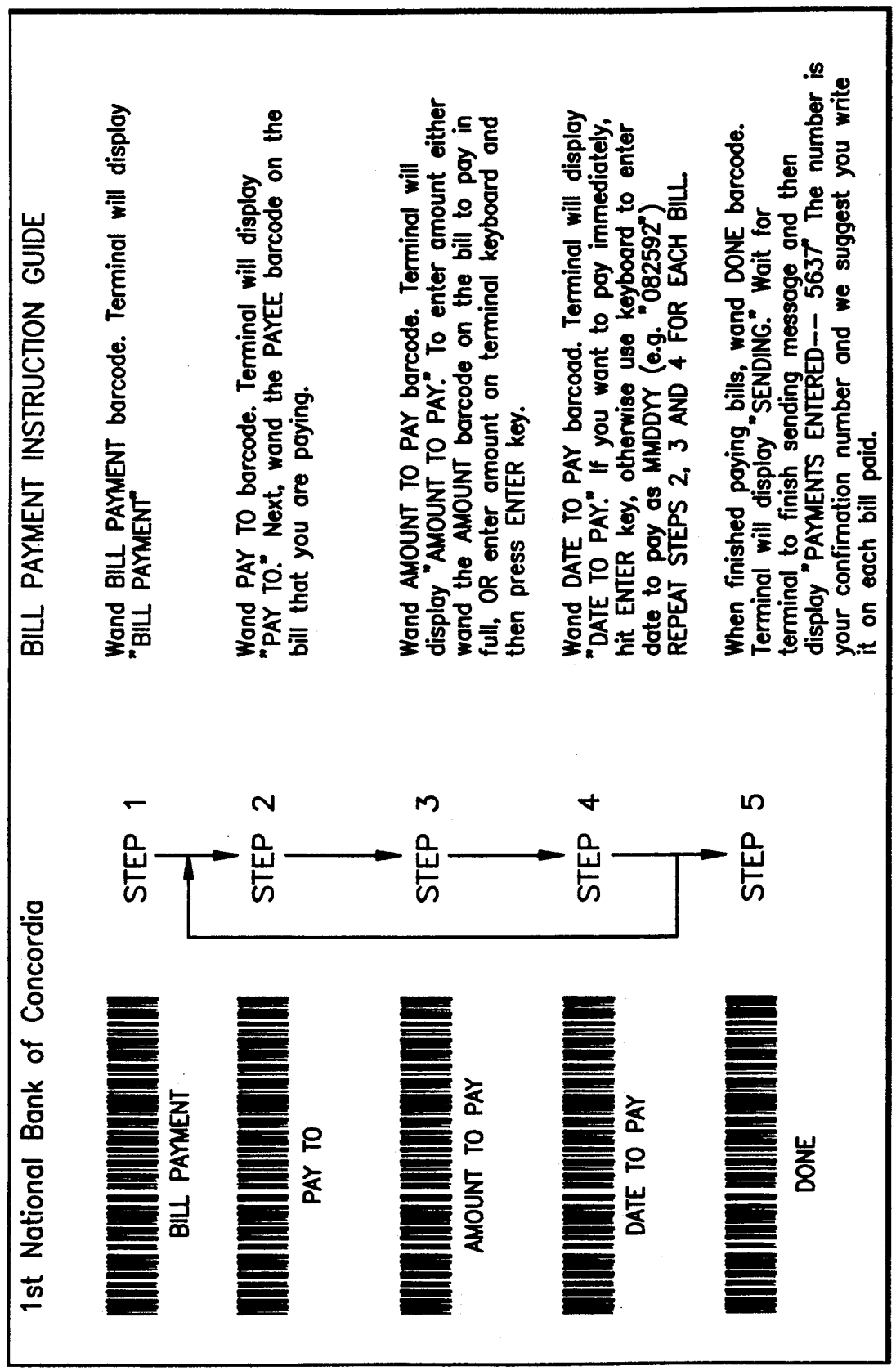
FIG. 12 illustrates a portion of a program command sheet serving as a portion of a transaction program useful in one embodiment of apparatus and method of this invention for the purpose of automated bill payment.

FIGS. 12–14 illustrate the application of the system and method of this invention to a Bill Payment transaction. In this case the program command sheet shown in FIG. 12 contains the program command bar codes and the bill from the PAYEE contains the data entry bar codes. When step 1 is performed, the terminal displays BILL PAYMENT and this time a code number for the customer's bank (the issuer of the program sheet) as well as the transaction type code number are loaded into the data packet as a result of this 'initiate transaction' program step. Steps 2-4 are repeat program command steps specifying how data collection will proceed.

In this case, Step 2 contemplates that each bill to be paid will have an actual PAYEE bar code printed on it. An alternative would be to furnish a separate bill paying data code sheet with all of the PAYEEs listed thereon and PAYEE bar codes for each. By printing a PAYEE bar code on the bill or invoice itself, additional PAYEEs can be added to the system without sending the customer a new PAYEE data sheet.

Step 3 contemplates that the user may enter this AMOUNT TO PAY data item either via the keyboard or the bar code wand. Note that the phone bill shown in FIG. 13 contains an AMOUNT bar code as well as a PAYEE bar code. The AMOUNT bar code need have no relation to the actual amount of the bill, but may be simply a code that indicates that the due amount is to be paid in full. The installment payment invoice shown in FIG. 14 has two data entry bar codes related to the AMOUNT TO PAY step. One indicates payment of the 'minimum due' amount stated on the bill. The other indicates payment in full. As will be seen there are predefined program commands and associated command execution routines stored in the program memory of the terminal that activate two data entry interfaces for optional use in data entry by the user.

Step 4 contemplates the entry of a date via the keyboard with a default date value of 'today' if the enter key is pressed first. It should be apparent that the associated printed bill itself could have a bar code specifying the due date. The 'DATE TO PAY' program command could then be a dual entry type command and the instructions could be amended to list the option of wanding the bar code for DUE DATE.

When Steps 2, 3 and 4 have been completed, Step 5 is performed and the associated DONE program command is one of the 'Terminate Transaction' type which results in placing a call to the host computer and uploading the data packet to the host. The host will return a message, such as the one shown in the instruction guide, to complete the transaction.

It should be apparent that, with the system of this invention, each of the PAYEEs has the option of combining some other programming feature with the bill paying feature. For example, the telephone company could provide a command program sheet and associated data entry sheet relating to optional reconfiguration of the customer's telephone feature package. In addition, the phone company could use the system to conduct a survey of attitudes or preferences of its customers and these surveys could be printed right on the back of the statement or on a separate sheet mailed with the billing statement. The phone company could also offer special products in a catalog sheet sent with the monthly bill.

If, for example a survey were included, the customer would add this survey response data to the other data by wanding the nested program command bar codes associated with the survey followed by wanding the data entry bar code using either of the approaches discussed below in the dedicated 'survey program.' Of course the host computer would have to be programmed to handle the presence of additional data items associated with each PAYEE, but this would involve simple programming to look for an associated different transaction code nested in the data fields associated with a particular PAYEE in the data packet. This transaction code would follow the regular data fields and would either be present and thus processed, or absent, either because the customer declined to participate or there was no additional transaction offered in connection with that particular monthly payment cycle for that PAYEE. If absent, the next data field would be the next PAYEE code, which the host computer would readily recognize.

It should be apparent from this explanation that the system of this invention provides the advantage of customizing the programming of the transaction data collection on the fly via the document driven programming feature of the invention. The data packet sent from the terminal to the host computer may contain mixtures of different types of transactions, all of which the host computer can readily be programmed to sort out and handle properly.

Poll and Survey Programs

Figure 15:
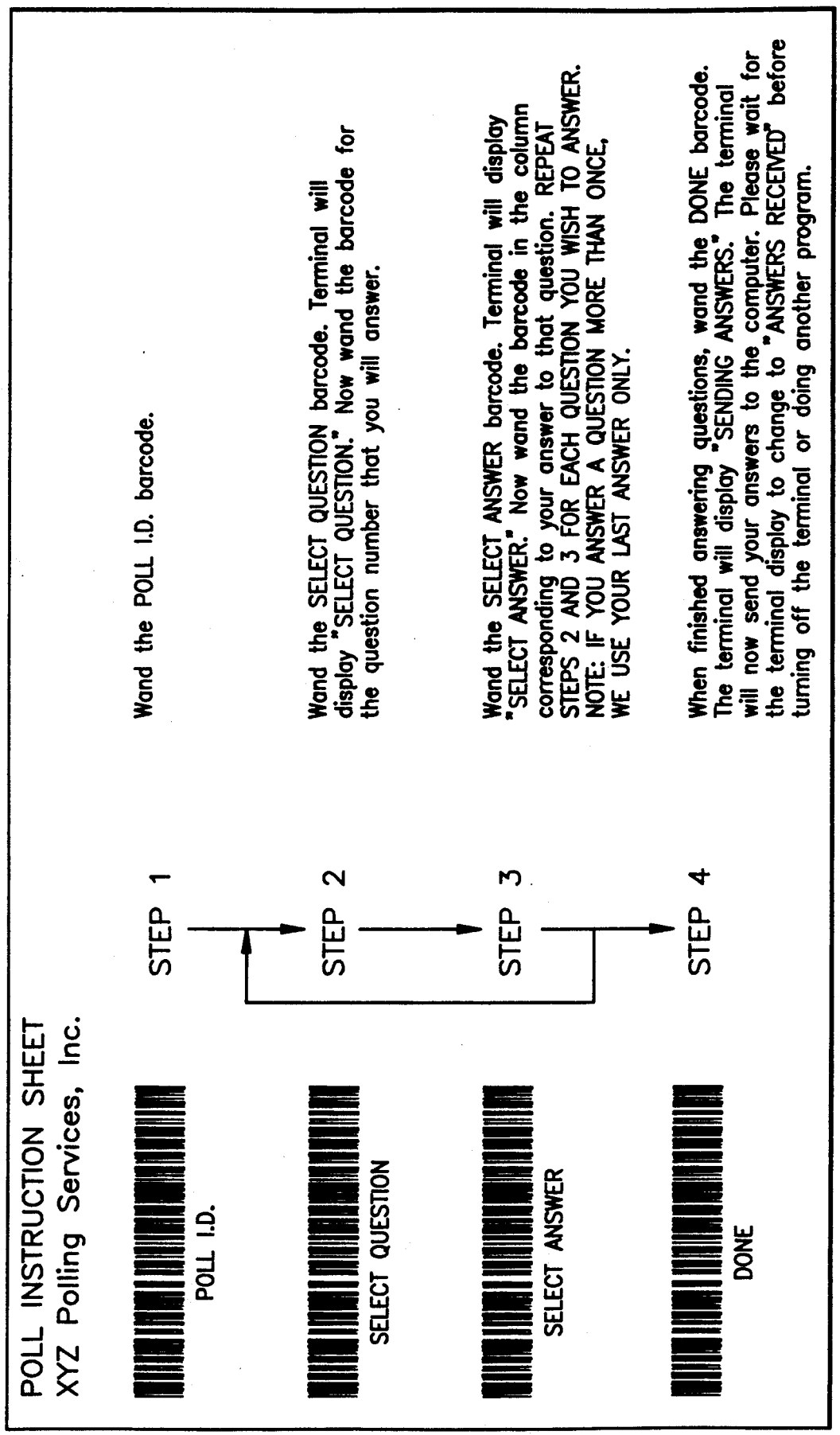
FIG. 15 illustrates a portion of a program command sheet serving as a portion of a transaction program useful in one embodiment of apparatus and method of this invention for the purpose of automated polling or surveying of citizen attitudes.

FIGS. 15–17 illustrate a Poll Taking program which can be implemented in the system of this invention. FIG. 15 shows the Program Command sheet and FIGS. 16 and 17 show the associated data entry sheets. Step 1 involves wanding the POLL I.D. bar code which is of the 'initiate transaction' type and will result in the opening of a data packet with a transaction type data item and a vendor data item specifying, a 'survey' and the 'XYZ Polling Service' respectively. Steps 2 and 3 are repetitive steps associated with wanding a question bar code from the data sheet page shown in FIG. 16 followed by wanding an answer bar code from the data sheet page shown in FIG. 17.

Note that by using a separate data entry step for entering the question number as well as the associated answer, the person responding is permitted to answer the questions in any order and can decline to answer some of the questions.

Obviously, this step could be deleted and then the person responding would be instructed to answer all questions in proper order so that the answers could be interpreted. Alternatively, a bar code could be printed in association with each answer as shown in FIG. 18. If each bar code for question and possible answer combination were unique, then the person responding could just wand the answer to each question that they wished to respond to.

Note also that the question bar codes shown in FIG. 16 and the answer bar codes shown on the bottom of FIG. 17 could be separate templates that are used for multiple different surveys. Using that approach avoids the expense of printing the bar codes on the survey question and answer sheet each time. If the survey question and answer bar codes were printed in an instruction booklet that covered the operation of the terminal, the user would be likely to keep it handy. The instruction booklet could also have a pocket containing a number of duplicate templates in case one is lost from time to time.

From the above description of how the system of this invention functions from a user standpoint, it would be a simple matter for any skilled programmer to create a working program command structure and command set together with a command manager program to handle command entry and processing and a set of command execution routines to be executed in response to entry of a particular one of the program commands. However, to illustrate this aspect of the system and method of this invention, the following brief description of one example will be given. No description will be given of the host side programming which is completely obvious to persons of ordinary skill in this art from the above description of the functions that the host computer must carry out.

Program Command Structure and Command Set

In accordance with this invention a transaction program command structure is defined and a set of transaction program commands utilizing that command structure are defined. These are defined as part of the process of creating a particular embodiment of the invention. In addition, this process includes providing a command manager program and a set of command execution routines, one for each of the defined transaction program commands. It will be apparent to those skilled in this art that these defining steps and programming steps can be carried out in a variety of ways with differing degrees of complexity.

One example of a defined Program Command Structure is the following:

> Command Code (numeric) +
> Message Field (alphanumeric) +
> "IDENT" Data Field (numeric)

Thus the bar code 51 shown in FIG. 5 could have the contents:

"01CATALOG ORDER198755"

where
- 01 is a numeric code for the 'initiate transaction' command;
- CATALOG ORDER is the content of the message field;
- 19 is the portion of the data field specifying the transaction type—'catalog order entry' in this case; and
- 8755 is the portion of the data field specifying the vendor or catalog identification.

The entire IDENT data field is placed into the data packet which is opened by the 'INITIATE TRANSACTION' command execution routine one possible version of which is shown in FIG. 20.

Table 1 below gives an example of a set of defined program commands and a description of the basic functionality associated with each. From this description, a skilled programmer can readily create an associated command execution routine for each command. This routine can be simple or complex depending, for example, on whether error checking steps are included. FIG. 21 illustrates what the program steps of a READ CARD execution routine associated with program command 02 might comprise.

FIG. 19 illustrates one example of the program steps that might be employed in a Command Manager program that handles the defined program command structure set forth above. The steps listed are self explanatory and are simply given by way of example.

TABLE 1

| COMMAND CODE | FUNCTION PERFORMED |
|---|---|
| 01 | Initiate Transaction |
| 02 | Read Data Card |
| 03 | Accept Keyboard Numeric |
| 04 | Accept Keyboard Alphanumeric |
| 05 | Accept One of  a) Keyboard Money Entry or b) Bar Code Data Item |
| 06 | Accept Keyboard Date Entry |
| 07 | Accept Keboard Yes/No Response |
| 08 | Accept Bar Code Data Item |
| 09 | Close Transaction—send data to host |
| 10 | Terminate Transaction |

Variations on the System and Method of the Invention

It should be apparent that there are numerous changes that could be made in the embodiments described above without departing from the general principles of this invention. Some such changes are discussed above in connection with the illustrative embodiments themselves. To illustrate other possible variations, it should be understood that the use of a dedicated bar code transaction terminal is only one approach to implementing this invention and a personal computer with a bar code interface and programmed via floppy disk could also be used to implement this invention.

Another alternative would be to use a dedicated terminal that is interfaced to a personal computer with program arrangements for storing each transaction in the PC for archiving purposes or to integrate the merchandise or food ordering with some personal budget tracking program.

It should be apparent that in a more sophisticated transaction terminal and program, one of the defined program commands might include one to cause storage in the terminal memory of one or more callable data packets which represent portions of a standing type of food order, for example. This would be useful to a customer who orders several of the same items each time an order is made. The same might be true of a bill paying program where the customer wishes to store a data packet representing his normal payment protocol and thus avoids going through all of the steps each time.

It should be understood that the transaction terminal might include additional hardware and associated interfaces, such as a simple printer device that could be used to record the transaction as it is entered and sent. This would give the customer a record that could be used to check against the actual goods delivered.

It should be apparent from the above description that the feature of this invention involving 'on the fly, document driven programming' of the transaction data collection process has numerous advantages over fixed programming which is difficult to alter even if new or altered program downloading capability is provided in the terminal. One of the specific advantages of this invention is that it is readily adaptable to changing the user language. With the user language prompts coded into the set of data codes that comprise program commands, the printed media itself alters the language and no internal change in the apparatus is required.

Those of skill in this art could make numerous other changes in the details of the hardware and software embodiments described above without departing from the scope of this invention as set forth in the claims.

What is claimed is:

1. Apparatus for managing a transaction, comprising
a transaction terminal having a manual code reading means for reading a data code printed on a visual medium; and
a transaction program comprising
at least one page of a visual medium having a first set of said data codes printed thereon in a prearranged sequence and comprising a predetermined sequence of program commands for carrying out all of the steps of a prearranged transaction, including a subset of program commands associated with a corresponding subset of data entry steps, and
a second set of said data codes printed on the same or another page of said visual medium, each comprising a prearranged item of transaction data for use in said data entry steps;
said transaction terminal including a computer means interfaced to said manual code reading means,
said computer means including program storage means and data storage means,
said program storage means storing both a command management program for managing the sequential entry and execution of said program commands and a set of command execution routines each of said command execution routines being associated with one of said program commands,
said set of command execution routines including at least one data entry routine including program steps for reading one of said second set of said data codes and storing the transaction data contained therein in said data storage means.

2. Apparatus as claimed in claim 1, wherein
said transaction terminal further comprises data communication means interfaced to said computer means and adapted for transmitting data via a communication channel to a host computer;
said predetermined sequence of program commands including a data transmit command following said subset of program commands associated with said subset of data entry steps;
said command execution routine associated with said data transmit command including a series of program steps for activating said data communication means to transmit data stored in said data storage means to said host computer.

3. Apparatus as claimed in claim 2, wherein
said transaction terminal further includes
at least one direct data entry means for entry of transaction data by a user of the terminal, and
a card reader means for reading a user account data stored on a transaction data card;
said predetermined sequence of program commands includes
at least one direct entry program command associated with entry of transaction data though use of said data entry means, and
a card read program command associated with operation of said card reader means;
said set of command execution routines includes
a direct data entry routine associated with said direct entry program command and comprising program steps for activating said direct data entry means and accepting and storing data entered into said data storage means, and
a card read routine associated with said card read program command and comprising program steps for activating said card reader means and accepting and storing user account data in said data storage means.

4. Apparatus as claimed in claim 3, wherein
said transaction terminal further includes a display device for displaying messages,
each of said program commands includes a message field comprising a message for display on said display device, and
said command management program includes a step for sending said message field to said display device following entry of each of said program commands.

5. Apparatus as claimed in claim 4, adapted for carrying out a plurality of different types of transactions, including at least one transaction involving use of a transaction data card having a magnetic stripe on which transaction data is stored, and wherein
said manual code reading means is a wand reader means for reading printed bar codes,
said direct data entry means is a keyboard for entering numeric data items,
said card reader means is a magnetic stripe card reader;
said display device is a visual alphanumeric display,
each of said first set of data codes is a printed bar code which includes a command code field, a message field, and a data field,
said command code field having one of a set of code values representing the command type, with said set including at least one 'initiate transaction' code value, one 'close transaction' code value, one 'read barcode' code value, one 'read data card' code value, and one 'keyboard entry' code value,
said display field being used to store an alphanumeric descriptor related to the operation associated with the command, and
said data field being used to store a set of data elements which may be required for execution of the program steps in an associated command execution routine and including a mandatory data field for said 'initiate transaction' command comprising a transaction type code and a vendor identification code;
each of said second set of data codes is a printed bar code which includes at least a data field storing a unique code;
said command execution routine associated with said 'initiate transaction' code value includes a program step to open a data packet location in said data storage means followed by a step to store said mandatory data field in said data packet;
said command execution routine associated with each of said 'read barcode' code value, 'read data card' code value, and 'keyboard entry' code value includes a program step to activate the associated interface device and a program step to append one or more data fields input by the associated device to said data packet in said data storage means; and said command execution routine associated with said 'close transaction' code value includes program steps to close said data packet, to activate said data communication means to establish a data link to said host computer, and to send said data packet to said host computer; and said first set of data codes comprising said predetermined sequence of program commands includes at least a first data code item with an 'initiate transaction' code value in said command code field, at least one subsequent data code item with a 'read barcode' code value in said command code field, and at least one subsequent data code item with a 'close transaction' code value in said command code field.

6. Apparatus as claimed in claim 5, wherein one of said different types of transactions is a catalog order transaction which utilizes an associated catalog having a plurality of predetermined product items therein which require the entry of product selection data code followed by entry of a set of data codes to specify customer choices of associated product parameters, each of said plurality of predetermined product items having a first set of bar codes printed on a catalog page associated with that product, and one or more second sets of bar codes printed on the the same or an additional catalog page, each of second sets of bar codes being associated with one of said associated product parameters, one of said bar codes in said first set being one of said second set of data codes and including a unique code value identifying that product, and others of said bar codes in said first set comprising program commands associated with data entry using said second sets of bar codes, whereby all of the data parameters associated with one of said predetermined product items are entered by first wanding a bar code in said first set representing said unique code value identifying said product, followed by wanding in turn each of said others of said bar codes in said first set followed by a wanding of one bar code in an associate one of said second sets of bar codes.

7. Apparatus as claimed in claim 1, wherein said transaction terminal further includes at least one direct data entry means for entry of transaction data by a user of the terminal, said predetermined sequence of program commands includes at least one direct entry program command associated with entry of transaction data though use of said data entry means, and said set of command execution routines includes a direct data entry routine associated with said direct entry program command and comprising program steps for activating said direct data entry means and accepting and storing data entered into said data storage means.

8. Apparatus as claimed in claim 1, wherein said transaction terminal further includes a display device for displaying messages, each of said program commands includes a message field comprising a message for display on said display device, and said command management program includes a step for sending said message field to said display device following entry of each of said program commands in said predetermined sequence.

9. Apparatus for managing a transaction, comprising a transaction terminal and a transaction program;

said transaction terminal comprising:

user input means for receiving input data from a terminal user;

output means for communicating output message activity to a terminal user;

manual code reading means for reading a data code printed on a visual medium, said reading being performed under manual control of a terminal user; and a computer means including control and data communication interfaces to said user input means, said output means, and said manual code reading means;

said transaction program comprising:

at least one page of a visual medium having a first set of said data codes printed thereon in a prearranged sequence and comprising a predetermined sequence of program commands for carrying out all of the steps of a prearranged transaction, including a subset of program commands associated with a corresponding subset of data entry steps, and a second set of said data codes printed on the same or another page of said visual medium, each comprising a prearranged item of transaction data for use in said data entry steps;

said computer means including program storage means and data storage means, said program storage means storing both a command management program for managing the sequential entry and execution of said program commands and a set of command execution routines each of said command execution routines being associated with one of said program commands, said set of command execution routines including at least one data entry routine including program steps for reading one of said second set of said data codes and storing the transaction data contained therein in said data storage means.

10. Apparatus as claimed in claim 9, adapted for managing a transaction which includes data communication with a host computer, wherein said transaction terminal further comprises:

data communication means interfaced to said computer means and adapted for transmitting data via a communication channel to a host computer; and a card reader means for reading a user account data stored on a transaction data card;

said predetermined sequence of program commands includes:

a card read command associated with operation of said card reader means, and a data transmit command following said subset of program commands associated with said subset of data entry steps;

said set of command execution routines includes:

a card read routine associated with said card read command and comprising program steps for activating said card reader means and accepting and storing user account data in said data storage means, and a data transmit routine associated with said data transmit command including a series of program steps for activating said data communication means to transmit data stored in said data storage means to said host computer.

11. Apparatus as claimed in claim 10, adapted for carrying out a plurality of different types of transactions and wherein said manual code reading means is a wand reader means for reading printed bar codes, said user input means is a keyboard for entering numeric data items, said output means is a visual alphanumeric display device, each of said first set of data codes is a printed bar code which includes a command code field, a message field, and a data field, said command code field having one of a set of code values representing the command type, with said set including at least one 'initiate transaction' code value, one 'close transaction' code value, one 'read barcode' code value, one 'read data card' code value, and one 'keyboard entry' code value, said display field being used to store an alphanumeric descriptor related to the operation associated with the command, and said data field being used to store a set of data elements which may be required for execution of the program steps in an associated command execution routine;

each of said second set of data codes in a printed bar code which includes at least a data field storing a unique code;

said command execution routine associated with said 'initiate transaction' code value includes a program step to open a data packet location in said data storage means;

said command execution routine associated with each of said 'read barcode' code value, 'read data card' code value, and 'keyboard entry' code value includes a program step to activate the associated interface device and a program step to append one or more data fields input by the associated device to said data packet in said data storage means; and said command execution routine associated with said 'close transaction' code value includes program steps to close said data packet, to activate said data communication means to establish a data link to said host computer, and to send said data packet to said host computer; and each of said plurality of different types of transaction has associated therewith one of set of unique, prearranged transaction programs which are specific to a particular vendor, and each of said transaction programs includes in said first set of data codes comprising said predetermined sequence of program commands:

at least a first data code item with an 'initiate transaction' code value in said command code field and a data field which identifies the type of transaction and data field which identifies the vendor.

at least second data code item following said first data code item with a 'read barcode' code value in said command code field, at least a third data code item following said first data code item with a 'read data card' code value in said command code field, and at least a fourth data code item following all of said first, second and third data code items with a 'close transaction' code value in said command code field.

12. A transaction terminal adapted for use by a customer in managing a plurality of different types of transactions involving communication with a host computer and adapted for supporting multiple vendors associated with each of said types of transactions, with each actual transaction to be managed having an associated vendor-specific transaction program furnished to the customer and comprising:

at least one page of a visual medium having a first set of said data codes printed thereon in a prearranged sequence and comprising a predetermined sequence of program commands for carrying out all of the steps of a prearranged transaction, including a subset of program commands associated with a corresponding subset of data entry steps, and at least one program command associated with identification of the type of transaction and the vendor associate with the transaction;

a second set of said data codes printed on the same or another page of said visual medium, each comprising a prearranged item of transaction data for use in said data entry steps;

said transaction terminal comprising:

manual code reading means for reading said data codes on said visual medium with said reading being done by manual manipulation by said customer; and a data communication means adapted for transmitting data via a prearranged communication channel to a host computer;

a computer means interfaced to said manual code reading means and said data communication means, said computer means including program storage means and data storage means, a command management program being stored in said program storage means for managing the sequential entry and execution of said program commands, and a set of command execution routines being stored in said program storage means, each of said command execution routines being associated with one of said program commands;

said set of command execution routines including:

at least one data entry routine including program steps for reading one of said second set of said data codes and storing the transaction data contained therein in said data storage means, and at least one data communication routine including program steps for transmitting stored transaction data to a host computer via said data communication means.

13. A transaction terminal as claimed in claim 12, wherein said transaction terminal further includes a display device for displaying messages, each of said program commands includes a message field comprising a message for display on said display device, and said command management program includes a program step for sending said message field to said display device following entry of each of said program commands in said predetermined sequence.

14. A transaction terminal as claimed in claim 13, further comprising at least one direct data entry means for entry of transaction data by a user of the terminal, and a card reader means for reading a user account data stored on a transaction data card;

and wherein:

said predetermined sequence of program commands in at least one vendor-specific transaction program includes at least one direct entry program command associated with entry of transaction data though use of said data entry means, and a card read program command associated with operation of said card reader means;

and said set of command execution routines stored in said program storage means includes:

a direct data entry routine associated with said direct entry program command and comprising program steps for activating said direct data entry means and accepting and storing data entered into said data storage means, and a card read routine associated with said card read program command and comprising program steps for activating said card reader means and accepting and storing user account data in said data storage means.

15. A transaction terminal as claimed in claim 14, adapted for use in conjunction with versions of said transaction program wherein:

each of said second set of data codes is a printed bar code which includes at least a data field storing a unique code; and each of said first set of data codes is a printed bar code which includes a command code field, a message field, and a data field, said command code field having one of a set of code values representing the command type, with said set including at least one 'initiate transaction' code value, one 'close transaction' code value, one 'read barcode' code value, one 'read data card' code value, and one 'keyboard entry' code value, said display field being used to store an alphanumeric descriptor related to the operation associated with the command, and said data field being used to store a set of data elements which may be required for execution of the program steps in an associated command execution routine and including a mandatory data field for said 'initiate transaction' command comprising a transaction type code and a vendor identification code;

and wherein in each of said vendor-specific transaction program said first set of data codes comprising said predetermined sequence of program commands includes at least a first data code item with an 'initiate transaction' code value in said command code field, at least one subsequent data code item with a 'read barcode' code value in said command code field, and at least one subsequent data code item with a 'close transaction' code value in said command code field, said manual code reading means is a wand reader means for reading said printed bar codes, said direct data entry means is a keyboard for entering numeric data items, said card reader means is a magnetic stripe card reader;

said display device is a visual alphanumeric display, said command execution routine associated with said 'initiate transaction' code value includes a program step to open a data packet location in said data storage means followed by a step to store said mandatory data field in said data packet;

said command execution routine associated with each of said 'read barcode' code value, 'read data card' code value, and 'keyboard entry' code value includes a program step to activate the associated interface device and a program step to append one or more data fields input by the associated device to said data packet in said data storage means; and said command execution routine associated with said 'close transaction' code value includes program steps to close said data packet, to activate said data communication means to establish a data link to said host computer, and to send said data packet to said host computer.

16. A method of managing the entry of transaction data comprising the steps of:

a. defining a transaction program command structure including at least a command code field and a data field;

b. defining a transaction data structure;

c. defining a set of transaction program commands each associated with a prearranged transaction program function, including at least one data entry function, and utilizing said transaction program command structure;

d. providing a command management program for managing entry and processing of program command and a set of command execution routines each associated with one of said transaction program commands and including program steps for carrying out said prearranged transaction program function;

e. imprinting on a visual medium a first set of data codes representing a prearranged sequence of said transaction program commands and a second set of data codes representing a prearranged set of transaction data items for selective use in said data entry function to provide a transaction program for carrying out a particular type of transaction;

g. scanning each of said first set of imprinted data codes in sequence with a manual code reader and in response to each of said imprinted data codes executing an associated command execution routine;

h. scanning a selected one of said second set of imprinted data codes in response to a command execution routine calling for data entry and recording data associated with said data code as a data field in a data packet associated with the transaction being entered.

17. The method of claim 16, adapted for use by a customer to manage transaction entry and communication to a host computer, and allowing for pluralities of transaction programs of different types and different vendors within each type, wherein step c. includes defining transaction program commands comprising 'initiate transaction' and 'close transaction' with said 'initiate transaction' command including a 'transaction type' and 'vendor identification' data fields;

step d. includes d.1. providing a command execution routine for said 'initiate transaction' command which includes a step of creating a data packet with said 'transaction type' and 'vendor identification' data fields stored therein, d.2. providing a command execution routine for said 'close transaction' command which includes a step of closing said data packet and transmitting said closed data packet to a host computer;

step e. is carried out separately for each transaction program associated with each vendor and said prearranged sequence of transaction program commands includes, in each transaction program, a first command of the 'initiate transaction' type and a last command of the 'close transaction' type.

* * * * *